US008628282B2

(12) United States Patent
Martin

(10) Patent No.: US 8,628,282 B2
(45) Date of Patent: Jan. 14, 2014

(54) SUPPLY AND RESETTING HYDRAULIC UNIT FOR A LIFTING ASSEMBLY WITH TWO SEPARATE SIMULTANEOUSLY ACTUATED POWERED BEARINGS

(75) Inventor: Philippe Martin, Pfulgriesheim (FR)

(73) Assignee: Lohr Industrie, Hangenbieten (FR)

( * ) Notice: Subject to any disclaimer, the term of this patent is extended or adjusted under 35 U.S.C. 154(b) by 69 days.

(21) Appl. No.: 13/383,940

(22) PCT Filed: Jul. 13, 2010

(86) PCT No.: PCT/FR2010/000507
§ 371 (c)(1),
(2), (4) Date: Feb. 17, 2012

(87) PCT Pub. No.: WO2011/007059
PCT Pub. Date: Jan. 20, 2011

(65) Prior Publication Data

US 2012/0141223 A1 Jun. 7, 2012

(30) Foreign Application Priority Data

Jul. 17, 2009 (FR) ..................................... 09 03522

(51) Int. Cl.
*B60P 3/08* (2006.01)

(52) U.S. Cl.
USPC ......................................................... 410/29.1

(58) Field of Classification Search
USPC .................. 410/24, 26, 28.1, 29.1; 298/22 P; 91/515, 171
See application file for complete search history.

(56) References Cited

U.S. PATENT DOCUMENTS 4,822,222 A * 4/1989 Zeuner et al. ................ 410/29.1
6,189,432 B1 2/2001 Colarelli et al.
2007/0017364 A1 1/2007 Veneziani

FOREIGN PATENT DOCUMENTS

FR 2413238 A1 7/1979

* cited by examiner

*Primary Examiner* — Stephen Gordon
(74) *Attorney, Agent, or Firm* — Davis & Bujold, PLLC; Michael J. Bujold

(57) ABSTRACT

A hydraulic unit (1) mounted on a vehicle with an adjustable platform which is supported by two mechanically separate arms actuated by a separate hydraulic lifting device (5, 6). The hydraulic unit has the supply and return and preferably includes a balance valve (21) for controlling lowering of the platforms; a flow divider (22) enabling a division of the supply fluid into two flows having an identical flow rate, and each supplying one of the hydraulic lifting devices; and a resetting solenoid valve (23) that, when the operator controls the resetting of the hydraulic lifting devices, regardless of the operation direction and position thereof, and isolates one of the hydraulic devices (6) in order to immobilize the same while the other hydraulic lifting device (5 or 6) is adjusted.

14 Claims, 10 Drawing Sheets

SUPPLY AND RESETTING HYDRAULIC UNIT FOR A LIFTING ASSEMBLY WITH TWO SEPARATE SIMULTANEOUSLY ACTUATED POWERED BEARINGS

This application is a national stage completion of PCT/FR2010/000507 filed Jul. 13, 2010 which claims priority from French application Ser. No. 09/03522 filed Jul. 17, 2009.

FIELD OF THE INVENTION

The present invention concerns a hydraulic balancing and resetting unit for a lifting assembly with two independent powered hydraulic elements which can be placed in identical positions at any given moment.

BACKGROUND OF THE INVENTION

Certain vehicles, particularly flat-bed carriers for transporting automobiles, are equipped with platforms or plates for carrying cargo, which are adjustable in height to facilitate loading and unloading operations.

These platforms are supported by an assembly of lifting frames that vary in number depending on the location and length of the platform. Each of these frames comprises two posts or dual lifting arms placed on either side of the vehicle, one on the right and one on the left.

Each of the posts or lifting arms is equipped with a hydraulic lifting device, conventionally one with a hydraulic auger motor or a hydraulic cylinder, for modifying the angle of the lifting arm or the height of the platform's recovery point and thereby varying the level of the platform supported.

To prevent undesirable torsion from damaging either the cargo being transported or the supporting platform itself, it is imperative that the movement of the hydraulic lifting devices be synchronized between both arms on a single lifting frame.

Synchronizing the positioning of the two left and right hydraulic devices on each lifting frame is necessary in order to keep the raised platform straight and horizontal and prevent it from slanting laterally.

SUMMARY OF THE INVENTION

The object of the invention is to propose a device for resetting the two right and left hydraulic lifting devices for each lifting frame relative to one another if they are not perfectly horizontal because their movement is poorly synchronized.

When the right and left hydraulic lifting devices are hydraulic auger motors, they are conventionally supplied in series. Thus, it is fairly easily to reset the two motors relative to each other, at the will of operator, by cutting the supply to one of them using a simple bypass. The unsupplied motor then stops, remaining immobilized in the same position and maintaining the load it supports, while the second auger motor continues moving until it is positioned identically to the first one. The supply to the two auger motors can then be reestablished so that synchronized movement resumes.

When the right and left hydraulic lifting devices are hydraulic cylinders supplied in parallel, the situation is more delicate. If the supply to one hydraulic cylinder stops, for example, because of a bypass, the other cylinder actually cannot remain in position and it fails.

Since hydraulic lifting cylinders are conventionally supplied in parallel and not in series like hydraulic auger motors, it is necessary to divide the hydraulic fluid in order to supply each of the cylinders separately. At the present time, no satisfactory device exists for dividing the flow of hydraulic fluid in a stable and completely equal way without a difference in the rate of flow between the two branches occurring at a moment's notice. This difference translates automatically to a shifting between the two lifting cylinders, which are no longer synchronized, and the platform begins to slant.

A device to reposition of both hydraulic cylinders relative to each other when such a failure occurs, regardless of the cylinders' position at that time, is highly desirable and even crucial.

This is the problem which the invention addresses.

To eliminate synchronization failures between the lifting arms, the prior art has attempted to join them mechanically using a torsion bar type of connector. This consists of a connecting tube extending transverse to the vehicle and joining the two lifting arms. This mechanical connection forces the movement of the two arms to be globally synchronized. However, it remains possible for there to be a slight, acceptable offset in amplitude, induced by torsion deformation.

Unfortunately, this prior art system of mechanical joining is not satisfactory because it is difficult to put in place and especially because it consumes considerable space on the vehicle. It is well known that the space available for operating systems is particularly limited on vehicles of this type, since a maximum amount of free space needs to be reserved for the cargo being transported. The space consumed by functional devices on the vehicle poses a critical problem; the concurrent challenge of reducing this wasted space is an important one.

The invention responds to this space problem by eliminating this very bulky mechanical torsion connection and furnishing a particularly compact, less voluminous system. Advantageously, with the system of the invention, the lifting arms remain mechanically independent.

Another resetting system, without a mechanical torsion connection developed in the prior art, allows the two arms to be mechanically independent. It consists of a system internal to the hydraulic lifting cylinders. These cylinders comprise a hydraulic fluid discharge track opening into their cylinder wall through a perforation accessible only when the cylinder is in the upper position. Therefore, when one of the cylinders is offset and arrives in advance at the upper position, the hydraulic fluid being supplied to it flows out through the discharge track through the perforation, which has become accessible, while the second cylinder continues to ascend until it also reaches the upper position. In this way, the two cylinders are resynchronized.

However, this prior art system only allows synchronization to be reestablished when the platform is in the final upper position, which is at the end of the course followed by the two hydraulic lifting cylinders. No regulation is possible when the platform is in the intermediate position because the perforations providing access to the discharge circuits are covered at that time. The operator can only observe powerlessly the appearance of a synchronization fault when it occurs during the ascent or the descent of the cargo being lifted.

Conversely, the resetting device of the invention can be actuated at any time by the operator and, therefore, it advantageously allows an error in synchronizing the movement of the two right and left lifting devices to be corrected regardless of the position of the platform being raised.

Furthermore, with the prior art system, the cylinder pistons are equipped with a peripheral gasket that must pass regularly over the inlet perforation in the discharge path, causing the gasket to degrade progressively. If the gasket is not replaced in time, micro leaks may appear in this area and there is no guarantee the load will be maintained. Such a situation is not acceptable for cylinders that must guarantee safe operation.

Advantageously, the resetting device of the invention does not have these drawbacks.

The device of the invention performs several functions simultaneously. It controls the descent of the load being supported, it splits the flow of hydraulic fluid, and it performs the resetting of the hydraulic lifting devices upon demand by the operator, regardless of the position of these hydraulic devices at that moment.

Additionally, all of these functions are integrated within one compact case called the hydraulic unit. It is, therefore, easy to install on a vehicle, despite the space problems that have always existed with this type of application. Moreover, it is easy to connect to the hydraulic circuit, as it is limited in the number of connections used. Assembly is simple and costs are reduced.

To resolve this technical problem, the invention furnishes a hydraulic unit for installation on a vehicle, especially a vehicle for transporting automobiles, comprising at least one plate or platform for transporting a load, adjustable in height, said plate or platform being supported by at least one lifting frame formed of two mechanically independent lifting arms, right and left, respectively, each of said lifting arms being equipped with an independent hydraulic lifting device for varying the height of the plate or platform it supports.

According to the invention, this hydraulic unit comprises the following hydraulic components:

a stream splitter having an inlet track and two outlet tracks and which regulates the flow of fluid to obtain two streams flowing at the identical rate on the two outlet tracks, regardless of the direction in which the fluid is flowing; and a dual-position solenoid valve having one inlet track and two outlet tracks which, in the first position, is passable from its inlet track to its first outlet track, as its second outlet track is blocked; and which, in its second position, is passable from its inlet track to its second outlet track, as its first inlet track is blocked.

These hydraulic components are placed in a hydraulic circuit that comprises:

a first branch comprising a first inlet conduit splitting at the level of a dividing point and a first outlet conduit and a second outlet conduit; and a second branch comprising a second inlet conduit ending at the inlet track of the stream splitter and extending at the two outlet tracks of the stream splitter on one side to a third outlet conduit; and on the other side, to a conduit leading to the inlet track of the solenoid valve and continuing at the first outlet track of the solenoid valve through a fourth outlet conduit, and at the second outlet track of the solenoid to a connecting conduit joining the second outlet track of the solenoid valve to the first inlet conduit.

The hydraulic unit of the invention is connected:

to the hydraulic fluid reservoir via the hydraulic control unit for the hydraulic lifting devices, at its first inlet conduit and at its second inlet conduit;

to one of the hydraulic lifting devices at its first outlet conduit and at its third outlet conduit; and to the other hydraulic lifting device at its second outlet conduit and its fourth outlet conduit.

According to the invention, the solenoid valve is in its first position while the two hydraulic lifting devices are operating normally and simultaneously allowing the plate or platform to be raised or lowered, and it passes into its second position and proceeds to reset the hydraulic lifting devices, relative to each other, by immobilizing one of the hydraulic lifting devices while the other one continues to move, such resetting being possible at any moment regardless of the direction of operation or the position of the hydraulic lifting devices.

The invention also concerns a vehicle, specifically a vehicle for transporting automobiles, comprising at least one plate or platform for transporting the cargo and which is adjustable in height, said plate or platform being supported by at least one lifting frame formed of two mechanically independent lifting arms, right and left, respectively, each of said lifting arms being equipped with an independent hydraulic lifting device for varying the height of the plate or platform it supports, in which vehicle each of the lifting frames is equipped with a hydraulic unit, according to the invention, connected to the hydraulic lifting devices of the lifting frame concerned.

BRIEF DESCRIPTION OF THE DRAWINGS

Other characteristics and features of the invention will become apparent from reading the following detailed description, with reference with the attached drawings, in which.

DETAILED DESCRIPTION OF THE INVENTION

Figure 1:
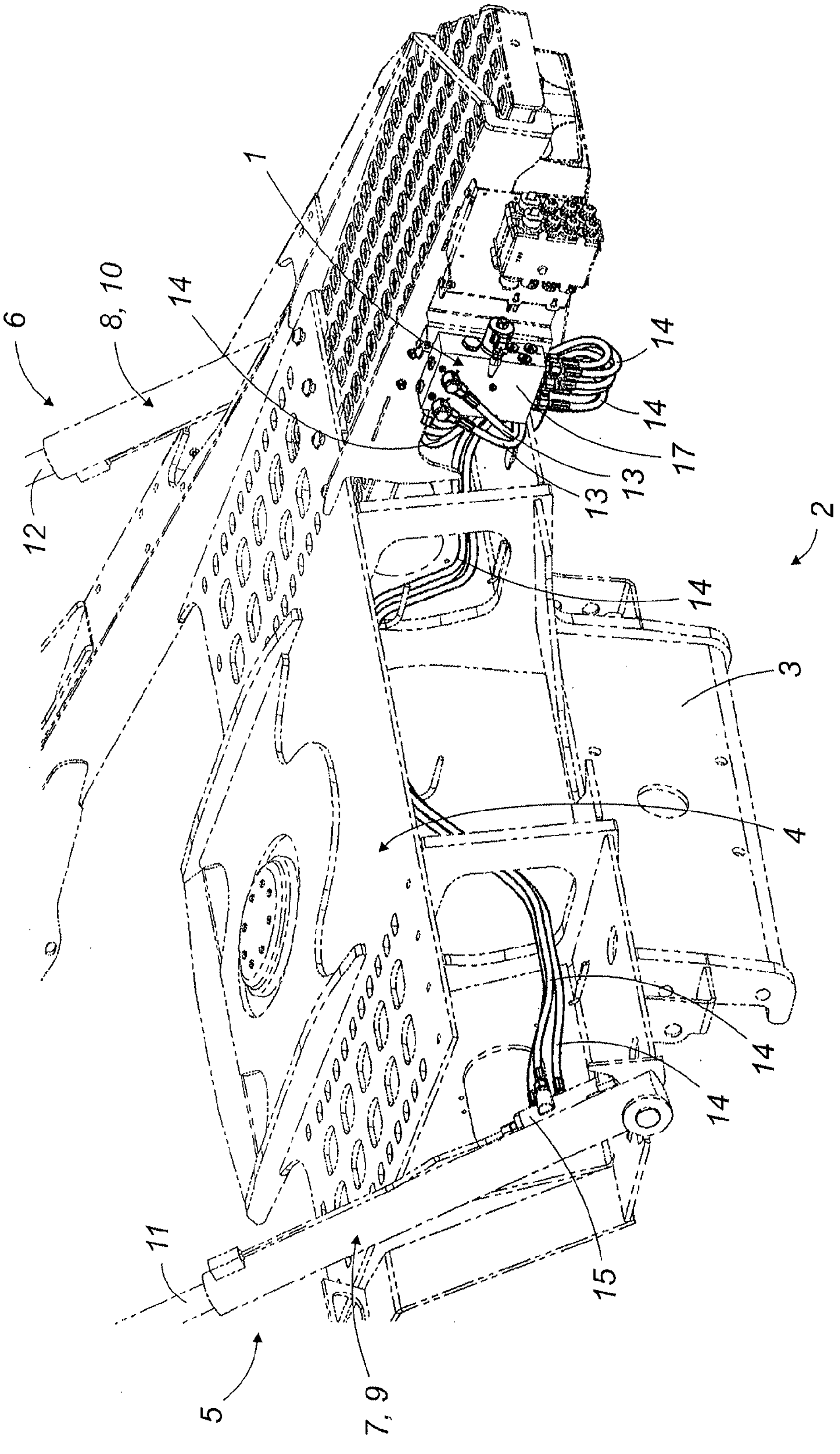
FIG. 1 is a perspective of the rear of an automobile transport vehicle equipped with a hydraulic unit according to the invention.

The hydraulic unit of the present invention will now be described in detail with reference to FIGS. 1-13. Equivalent elements shown in different drawings will bear the same reference numerals.

In FIG. 1 hydraulic unit 1 of the invention is shown in its environment and during use, installed on the rear of a vehicle 2, specifically an automobile-transporting vehicle according to a preferred, but non-limiting, exemplary application of the invention.

Hydraulic unit 1 is installed on the chassis 3 of vehicle 2 below the lower plate 4 of the vehicle. It supplies and controls two hydraulic lifting devices, left device 5 and right device 6, respectively, which actuate the left and right lifting arms of a lifting frame that is not shown.

Depending upon the applications, hydraulic lifting devices 5 and 6 may actuate arms, posts, upright elements, supports or any other elements of a lifting device that supports a variable height plate or platform. For purposes of simplification, all these elements, whatever their exact nature, will be designated by the term "arm" for the remainder of this description and in the claims, with no limitations intended.

Hydraulic lifting devices 5 and 6, shown in this drawing, are hydraulic cylinders 7 and 8 and more specifically, secured hydraulic cylinders 9 and 10. As described below, the use of hydraulic unit 1 of the invention is not limited to only this type of secured hydraulic cylinders 9 and 10. Hydraulic unit 1 of the invention can also be used with conventional hydraulic cylinders 7, 8 or even with a different type of hydraulic lifting device 5, 6, such as auger motors, for example.

The movement of shafts 11 and 12 of cylinders 9 and 10 makes it possible to vary the height of the upper platform of the vehicle (not shown).

A hydraulic unit 1, according to the invention, is preferably connected to hydraulic lifting devices 5 and 6 on each of the vehicle's lifting frames. In order to minimize the length of the hydraulic connectors to be used, hydraulic unit 1 is preferably located between the two lifting arms of the frame concerned, for example, generally at the level of the vehicle's longitudinal axis and thus more or less in the middle of the two lifting arms or, for example as shown, on one side of the vehicle, preferably the side where the manual or the electric hydraulic control unit for the two hydraulic lifting devices 5, 6 is located.

Hydraulic unit 1 is connected by two supply connectors 13 to the hydraulic fluid reservoir, via the hydraulic control unit, for the lifting devices concerned. It is also connected by a unit of distribution connectors 14 to the two hydraulic lifting devices 5 and 6.

In the instance shown where the lifting arms are equipped with secured hydraulic cylinders 9 and 10, the distribution connectors 14 number three per cylinder and they end at the level of the securing device 15 or 16 for each cylinder 10.

These connectors 13 and 14 may be made either entirely or partially in the form of either flexible or rigid hydraulic tubes.

Figure 2:
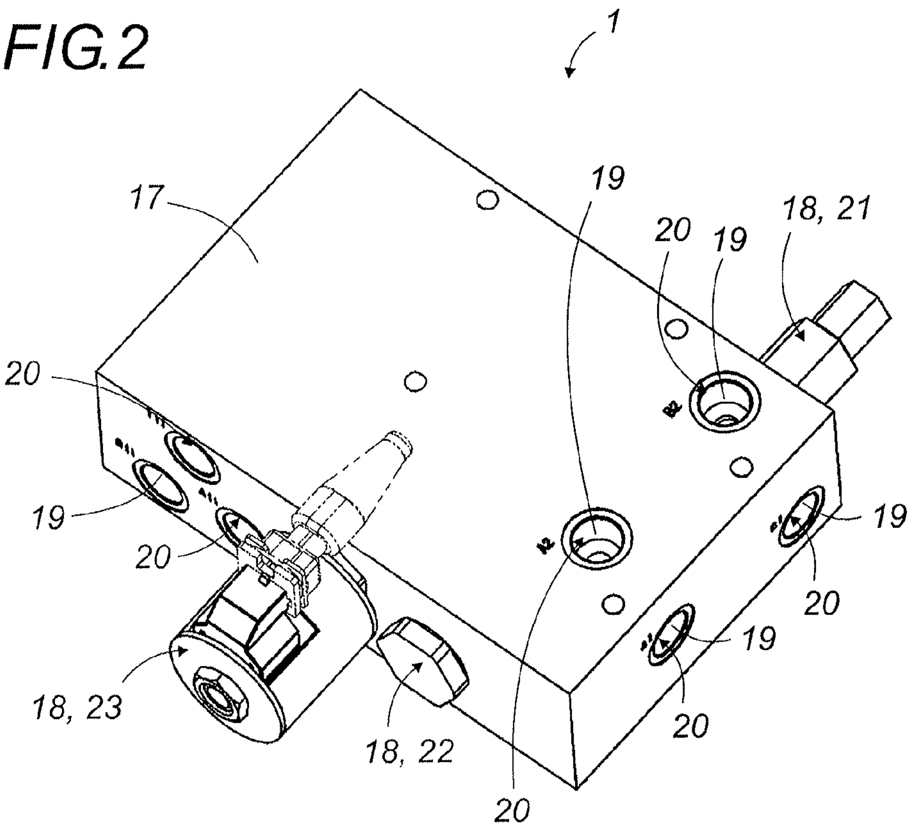
FIGS. 2 and 3 are front and rear perspectives, respectively, of a hydraulic unit according to the invention.
Figure 3:
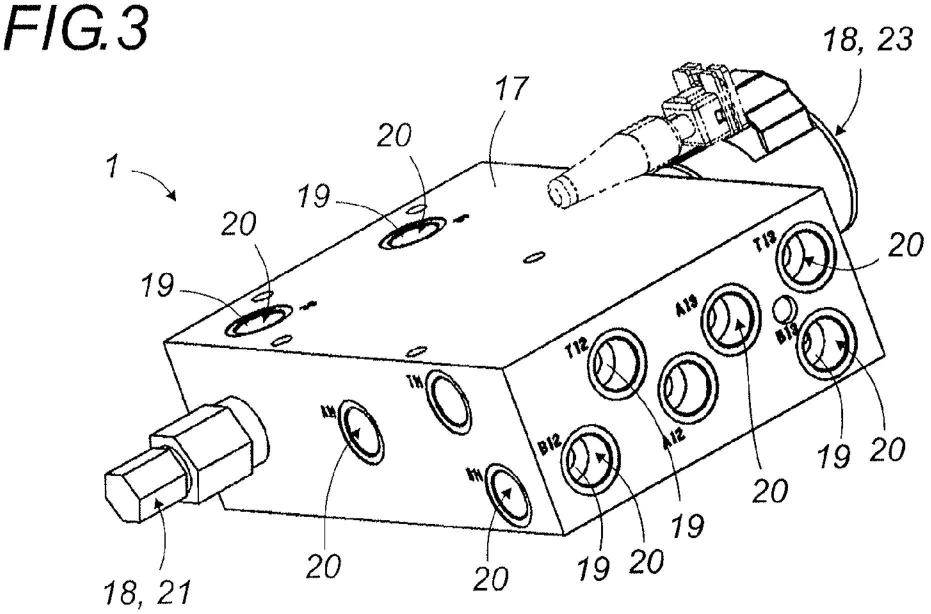
Figure 4:
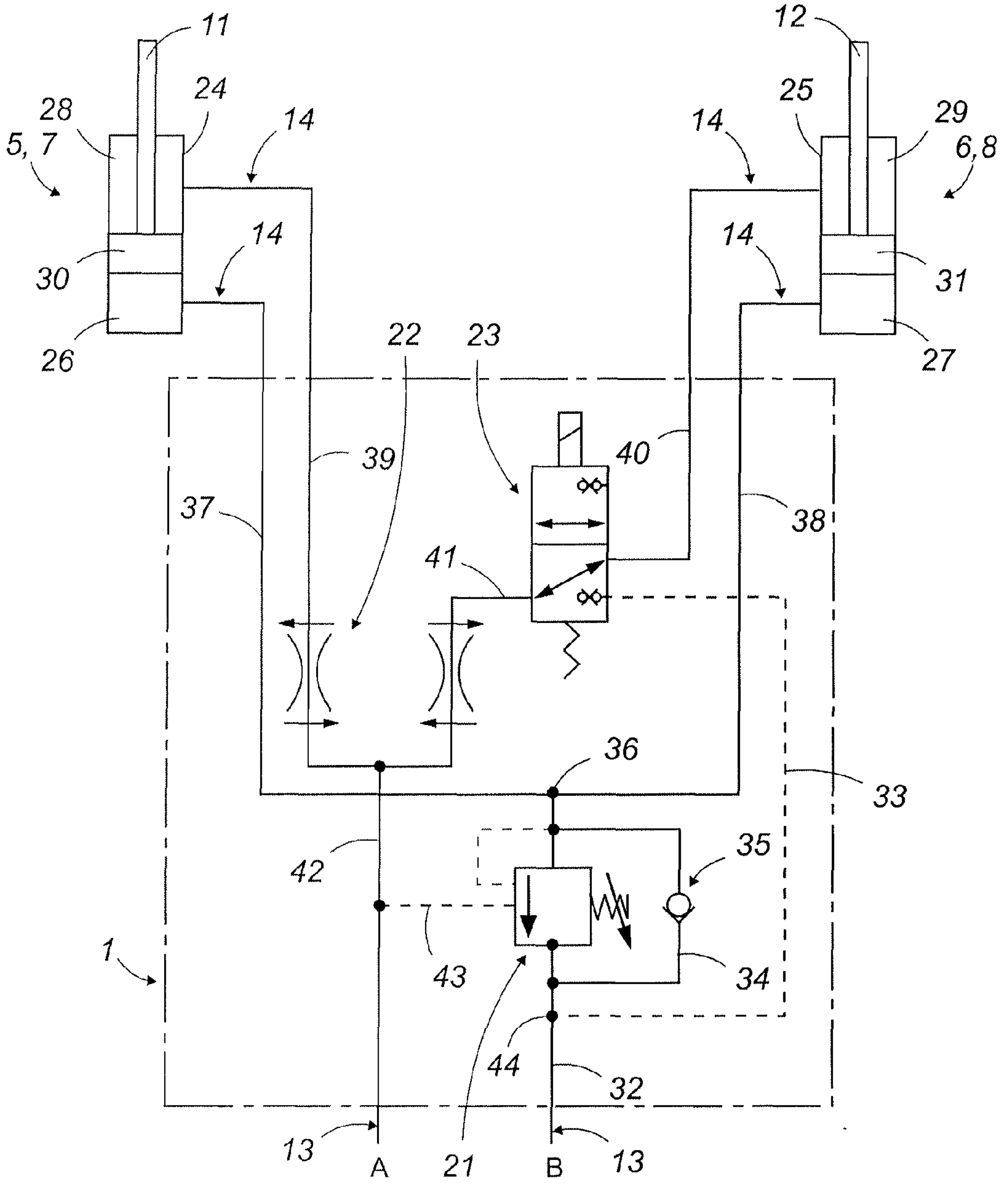
FIG. 4 is a simplified hydraulic schematic of a hydraulic unit according to the invention connected to two simple hydraulic cylinders.

The hydraulic unit 1 of the invention is shown alone in FIGS. 2 and 3.

It preferably comprises a compact body 17 that surrounds the hydraulic circuit and the hydraulic components of unit 1.

This body 17 may take the form of a generally parallelepipedal block, for example, in which various perforations have been drilled to form housings for receiving the hydraulic components 18 necessary for the operation of hydraulic unit 1, as well as conduits 19 for the passage of hydraulic fluid.

The unit of conduits 19 forms a hydraulic circuit that will be described in detail below. Conduits 19 open outside body 17 through orifices 20, which are of the appropriate size and shape for introduction of the extremity of a connector 13 or 14, forming a sealed connection in this area between the connector and the concerned conduit 19.

In order to facilitate the hydraulic connections and thus simplify installation of hydraulic unit 1, each inlet conduit and/or outlet conduit on the hydraulic circuit of unit 1, or only certain ones, may open outside body 17 through several equivalent orifices 20 situated at different locations on unit body 17 and preferably on different surfaces thereof in order to ensure that at least one of these orifices 20 always remains physically accessible. This makes it possible to form easily the hydraulic connections regardless of the position and the size of the installation area for unit 1, or the orientation of the unit in the assembled position. Unused orifices are blocked using stoppers or some other means of tightly sealing them.

The shown hydraulic unit 1 contains three principal hydraulic components 18: a balance valve 21, a stream splitter 22 and a solenoid resetting valve 23.

Balance valve 21 is not vital for all applications. When it is present, its function is to brake the descent of the platforms, which is a powered descent, and to control their descent so that it is progressive and not too rapid. Balance valve 21 does not open until there is sufficient incoming fluid pressure. Thus, an automatic and progressive equilibrium is established, in the area of valve 21, between the incoming fluid pressure and the weight of the descending load.

Balance valve 21 fulfills a supplementary function when hydraulic lifting devices 5, 6 are secured cylinders 9, 10 comprising a securing device 15, 16 with gates as shown schematically in FIGS. 10 through 13.

In this case, to ensure that the platforms are maintained in position, balance valve 21 keeps the return closed as long as the gates on securing devices 15, 16, for secured hydraulic cylinders 9, 10, are closed, thus providing additional security. To do this, the pressure applied to open it must be greater than the pressure that opens the safety gates on the cylinders. The gates on securing devices 15, 16 of the cylinders open, therefore, before the load is allowed to descend when balance valve 21 opens.

Stream splitter 22 is a static stream splitter that balances the passage of hydraulic fluid passing through it by creating two outgoing streams with identical flow rates, from a single incoming stream. This component functions regardless of the direction in which the fluid circulates. In the reverse direction, it regulates the flow rate of the incoming streams and allows two incoming streams with the identical flow rate to pass through, reuniting them into a single outgoing stream. The stream splitter fulfills its balance function regardless of the load on the two cylinders and even when the two loads are not identical.

Solenoid resetting valve 23 is a triple track, dual position solenoid valve. It is passable as long as the operator does not order resetting of hydraulic lifting valves 5, 6, for example, by pressing on a button provided for this purpose. It is preferably a solenoid valve with gates that produces a tighter seal than a wedge gate valve.

The operation of hydraulic unit 1, according to the invention, will now be described in detail with reference to the hydraulic schematics in FIGS. 4 through 13.

In these drawings the following conventions have been adopted: the conduits through which fluid flows are shown by solid lines, in bold when the fluid is pressurized and in light type when there is no pressure. The conduits through which no fluid flows are shown by broken lines, in bold when the fluid is pressurized and in light type when there is no pressure.

In these drawings certain hydraulic components 18 and conduits 19 have been arbitrarily placed on the left side and others on the right side. Obviously, in other embodiments of the invention, this arrangement could just as well be reversed without affecting the operation of the device.

First, FIGS. 4 through 8 show a basic embodiment of the invention.

In this base variation, the inlets and outlets of hydraulic unit 1 have not been doubled and hydraulic unit 1 has been designed specifically to cooperate with hydraulic devices 5, 6, each requiring only two tracks for the passage of fluid, used alternately in both directions depending on the direction in which hydraulic devices 5 and 6 are operating.

These hydraulic devices 5, 6 are conventional hydraulic cylinders, for example, without any securing system. In this instance, maintaining the platform in position once the height has been regulated, notably during travel, is not accomplished by hydraulic blocking in the area of hydraulic lifting devices 5, 6. It must be maintained in some other way, for example, by the operator positioning lateral pins in the area of cylinders 7 and 8 or in the area of the lifting arms, or by any other mechanical or other type of blocking means.

The hydraulic devices 5 and 6, shown in FIGS. 4 through 8, are two-way cylinders 7, 8 with conventional cylinder bodies 24, 25 surrounding a large chamber 26, 27 and a small chamber 28, 29 separated by a piston 30, 31 from which the rod 11, 12 of the corresponding cylinder extends.

Hydraulic unit 1 is connected to the hydraulic fluid reservoir via the hydraulic control unit by two supply connectors 13, one bringing fluid to the system inlet and the other alternately returning fluid to the reservoir, depending upon the direction in which cylinders 7, 8 are operating.

First, the normal operation of the device will be described, when the shafts 11, 12 of the two cylinders 7, 8 extend or retract simultaneously without the operator performing any resetting.

Figure 5:
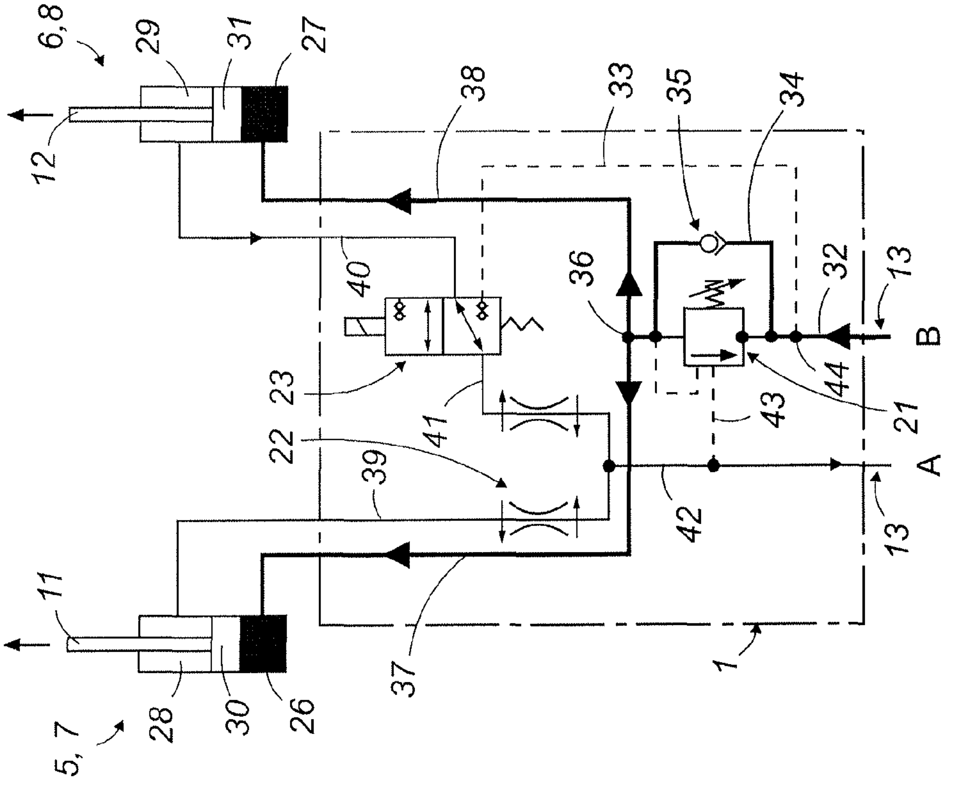

When the operator controls the ascent of the platform without performing any resetting, the device is in the situation depicted in FIG. 5.

Hydraulic unit 1 is supplied with hydraulic fluid through its orifice B, with the pressurized fluid entering through conduit 32.

The fluid encounters a first conduit 33 which has a closed extremity in the area of solenoid valve 23 when the device is in this configuration.

The fluid then progresses toward balance valve 21 which is in the closed position. It short-circuits this valve through a bypass conduit 34 which has a gate 35 inserted in it, through which the fluid passes in the direction of travel, allowing it to reach a T-shaped division point 36 where it separates into two streams progressing to conduits 37 and 38, each one supplying a large chamber, 26 or 27, respectively, in one of cylinders 7, 8.

The hydraulic fluid entering large chambers 26, 27 of cylinders 7, 8 causes pistons 30, 31 to ascend and thus shafts 11, 12 to extend outside cylindrical bodies 24, 25 of cylinders 7, 8 thereby making the corresponding platform ascend.

The hydraulic fluid located in small chambers 28, 29 of cylinders 7, 8 is expelled from the cylinders through connectors 14 and returns to hydraulic unit 1 via conduits 39 and 40.

The fluid progressing through conduit 39 arrives directly to one of the inlet paths of stream splitter 22. The fluid progressing through conduit 40 first encounters solenoid valve 23. In this operational mode, when the operator has not ordered repositioning, solenoid valve 23 is passable; the fluid passes through and travels through conduit 41 to the other inlet track of stream splitter 22.

Stream splitter 22 operates here to recompose the stream and it functions in such a way that the two arriving streams flow at identical rates on each of its inlet tracks, regardless of the load on the two cylinders. This synchronizes the operation of the two cylinders 7, 8.

From these two incoming streams that it has formed with identical flow rates, stream splitter 22 forms a single outgoing stream which leaves through conduit 42 and exits hydraulic unit 1 through its orifice A to return to the reservoir through one of the supply connectors 13, via the hydraulic control unit.

Before leaving unit 1, the hydraulic fluid progresses through conduit 42 to which a conduit 43 is attached for controlling balance valve 21. However, in this case, the fluid pressure is not sufficient to force balance valve 21 into the open position.

Figure 6:
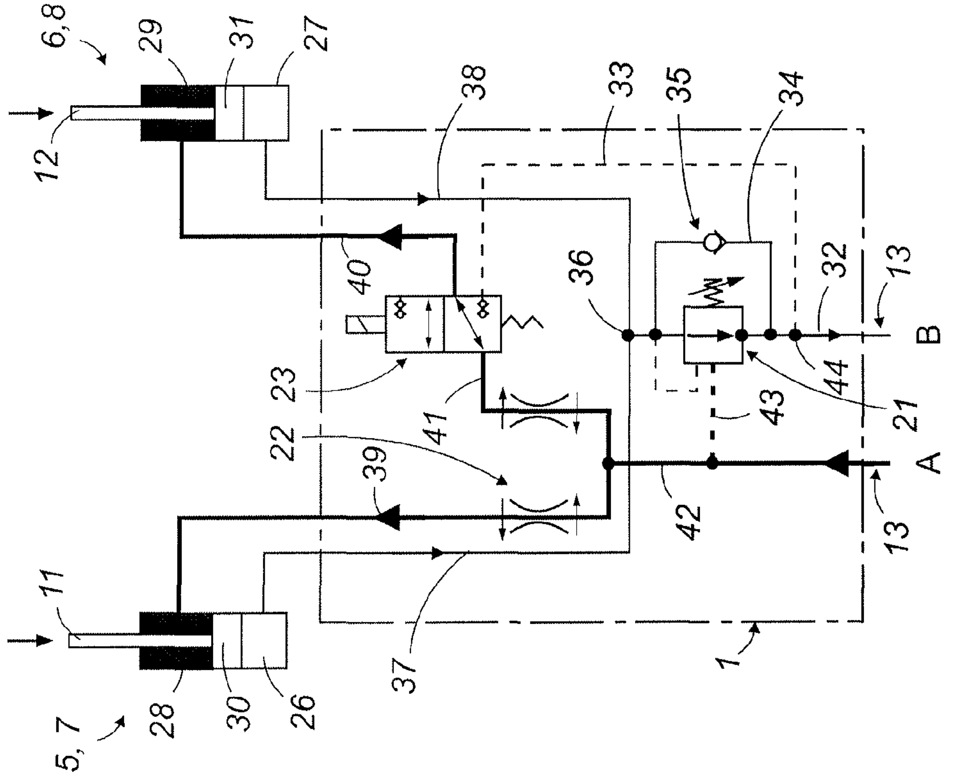
FIGS. 5 and 6 are simplified hydraulic schematics illustrating operation of the hydraulic unit of FIG. 4 while the shafts of the hydraulic cylinders are extended and retracted, respectively.

When the operator orders the descent of the platform without ordering resetting, as shown in FIG. 6, hydraulic unit 1 is then supplied through orifice A and the fluid penetrates conduit 42.

When the fluid reaches control conduit 43, this time it has enough pressure to push balance valve 21 into open position.

The hydraulic fluid reaches the entry to stream splitter 22, which separates it into two streams with an identical flow rate sent through conduits 39 and 41.

The fluid progressing through conduit 39 proceeds directly to small chamber 28 of left cylinder 7 and fills it, while the fluid progressing through conduit 41 first passes through solenoid valve 23, which is in passable position, before going on to supply small chamber 29 of right cylinder 8 through conduit 40.

The entry of hydraulic fluid into small chamber 28, 29 provokes retraction of cylinder shafts 11 and 12 and thus the descent of the corresponding platform. Since the fluid flows at an identical rate through conduits 39 and 40 because of stream splitter 22, the operation of the two cylinders is synchronized.

The hydraulic fluid in large chambers 26, 27 of cylinders 7, 8 is expelled toward hydraulic unit 1 and through its conduits 37 and 38.

It recombines into a single stream at division point 36 and passes through balance valve 21 which is in the passable position this time, to escape hydraulic unit 1 through orifice B via conduit 32 and return to the reservoir by means of one of the supply connectors 13 via the hydraulic control unit.

In this basic embodiment of the hydraulic unit of the invention, it is equally possible to place the stream splitter either in the hydraulic circuit near large chambers 26, 27 or near small chambers 28, 29 of cylinders 7 and 8. It is therefore possible to exchange its position with that of division point 36.

Since the operation of stream splitter 22 is by nature less than perfect, it happens that a positioning problem may result in lack of synchronization between cylinders 7 and 8. In this case the operator controls resetting of the device by activating solenoid valve 23, for example, by pressing a control button and keeping it depressed until the positioning problem is resolved and the two cylinders are again synchronized. This resetting procedure can be performed regardless of the direction in which the cylinders are operating and regardless of their position.

Figure 8:
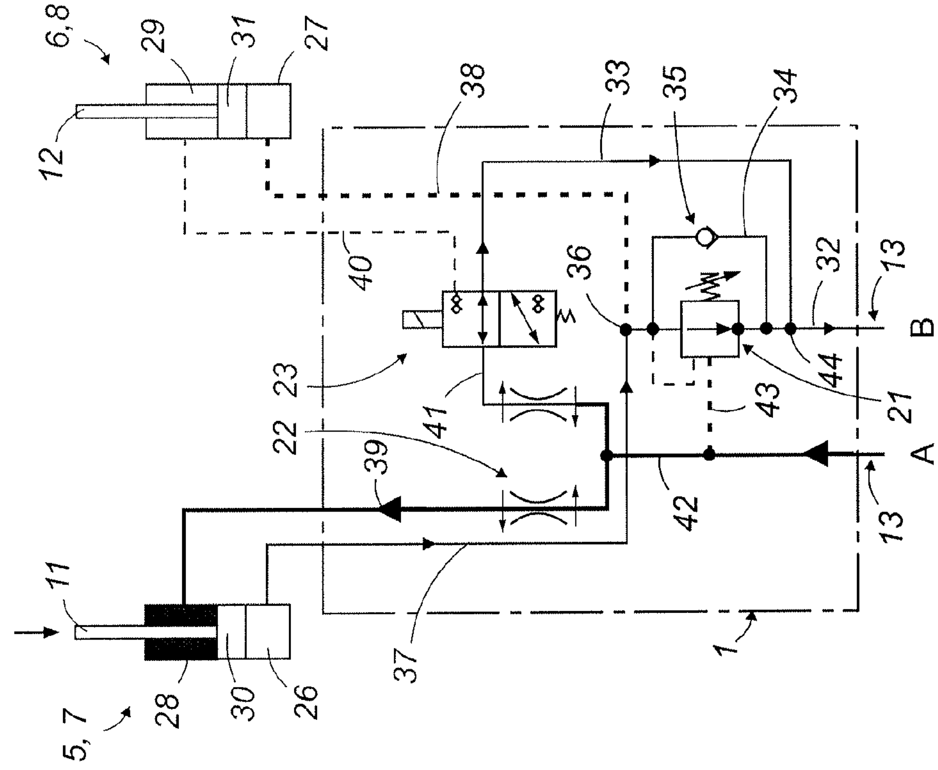
FIGS. 7 and 8 are simplified hydraulic schematics illustrating operation of the hydraulic unit of FIG. 4 when resetting is requested by the operator, said resetting being accomplished by extension or retraction of the left cylinder shaft.
Figure 7:
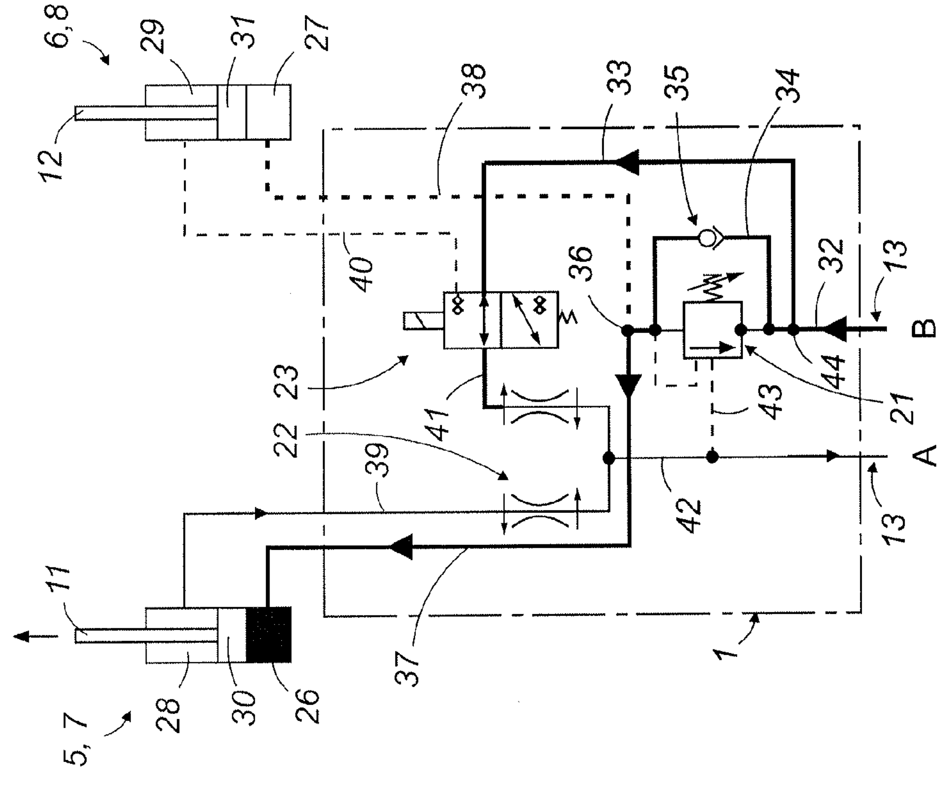

FIGS. 7 and 8 show the configuration of the next stage. Resetting consists of stopping one of the cylinders by isolating it while the second one continues to operate, with the operator selectively controlling shaft extension or retraction according to the situation until resetting of the two cylinders has been established.

In the embodiment shown in FIGS. 7 and 8, the cylinder isolated during the resetting operation is right cylinder 8. A person skilled in the art can easily imagine a variation using left cylinder 7 by simply reversing the positions of certain hydraulic components on the circuit. Generally, the cylinder that is isolated during resetting is preferably the one located on the side opposite the manual controls so the operator is located beside the active cylinder for better visibility and control over its movement.

When the operator orders resetting, solenoid valve 23 is fed and placed in reset position as shown in FIGS. 7 and 8. In this position, conduit 33 is no longer blocked and it is placed in communication with conduit 41 through solenoid valve 23.

Conversely, conduit 40, which communicates with small chamber 29 in right cylinder 8, terminates at solenoid valve 23 in a gate that is in closed position. The fluid contained in small chamber 29 can no longer escape, thereby making it impossible to displace piston 31 and or move shaft 12 of cylinder 8, which is isolated and therefore immobilized.

At the point during the resetting process when the operator needs to order extension of left cylinder 7 (upward height adjustment), the system is in the configuration shown in FIG. 7.

As before, the hydraulic unit is supplied through orifice B by conduit 32.

A portion of the fluid passes through conduit 33 and traverses solenoid valve 23, reaching one of the two inlet tracks of stream splitter 22 via conduit 41.

The remaining fluid short-circuits balance valve 21, in the closed position, through bypass conduit 34 and reaches division point 36.

Since the path of piston 31 is blocked, the fluid can no longer supply large chamber 27 of right cylinder 8. Therefore it will only fill the large chamber 26 of left cylinder 7, passing through conduit 37.

Hydraulic fluid entering large chamber 26 causes the extension of shaft 11 from cylinder 7, as well as the expulsion of hydraulic fluid located in small chamber 28 toward conduit 39 of hydraulic unit 1.

The expelled fluid arrives directly at the other inlet track of stream splitter 22, which reforms a single outgoing stream from the two streams arriving through conduits 39 and 41. This outgoing stream exits through conduit 42, which communicates with conduit 43. This outgoing fluid lacks sufficient pressure to force balance valve 21 to open. It escapes from hydraulic unit 1 to return to the reservoir via the hydraulic control unit.

During the resetting process, when the operator controls the return of left cylinder 7 (downward height adjustment), the system is in the configuration shown in FIG. 8.

The hydraulic fluid enters hydraulic unit 1 through conduit 42 and pushes balance valve 21 into open position via conduit 43.

It then arrives at the entry to stream splitter 22, which separates it into two streams of identical flow rate moving through conduits 39 and 41.

The fluid progressing through conduit 41 traverses solenoid valve 23 and it is sent outside hydraulic unit 1 toward the hydraulic control unit and the reservoir, via conduits 33 and 32, while the fluid progressing through conduit 39 continues on to fill small chamber 28 of left cylinder 7 and thus provoke the return of cylinder shaft 11.

The hydraulic fluid present in large chamber 26 of cylinder 7 is expelled through conduit 37 of hydraulic unit 1. Since right cylinder 8 is blocked, the fluid is forced, at division point 36, to flow toward balance valve 21, which it traverses to rejoin conduit 32 and return to the reservoir via the hydraulic control unit using supply connector 13.

When shaft 11 of left cylinder 7 has returned to the same position as shaft 12 of right cylinder 8, the operator stops the resetting, for example, by releasing the control button. Operation of the two cylinders then continues in the conventional, synchronized fashion according to one of the two normal operational modes described previously.

FIGS. 9 through 13 represent a second embodiment of hydraulic unit 1 of the invention, designed specifically for connection to two secured cylinders 9 and 10. Such hydraulic devices 5, 6 each require three tracks for fluid passage, two of them being used alternately in two directions depending on the direction in which the cylinders are operating, and the third used for operation of the securing device 15, 16.

This hydraulic unit comprises the same principal hydraulic components 18 as the basic embodiment previously described, as well as a similar hydraulic circuit. However, the following differences are noted:

Conduit 33, which in the basic embodiment begins at a point of intersection 44 with conduit 32 and ends at solenoid valve 23, proceeds on the side with point of intersection 44 through a conduit 45 opening outside hydraulic unit 1 through orifice T12; and on the other side, through a conduit 46 opening through orifice T13. During operation these supplementary conduits 45 and 46 are connected by a distribution connector 14 to securing devices 15, 16, respectively, for secured cylinders 9 and 10.

This arrangement of supplementary outlet conduits 45 and 46 is easy to construct and represent. However, either one these supplementary outlet conduits 45, 46 may be connected to any point on connecting conduit 33 or to any point on first inlet conduit 32 that is located before balance valve 21 when first inlet conduit 32 has one.

Alternatively, hydraulic unit 1 may contain only a single supplementary outlet conduit joined to connecting conduit 33 or to inlet conduit 32, while the two connections 14 required for operation of the securing devices for the secured cylinders may be interconnected outside hydraulic unit 1, for example.

Figure 9:
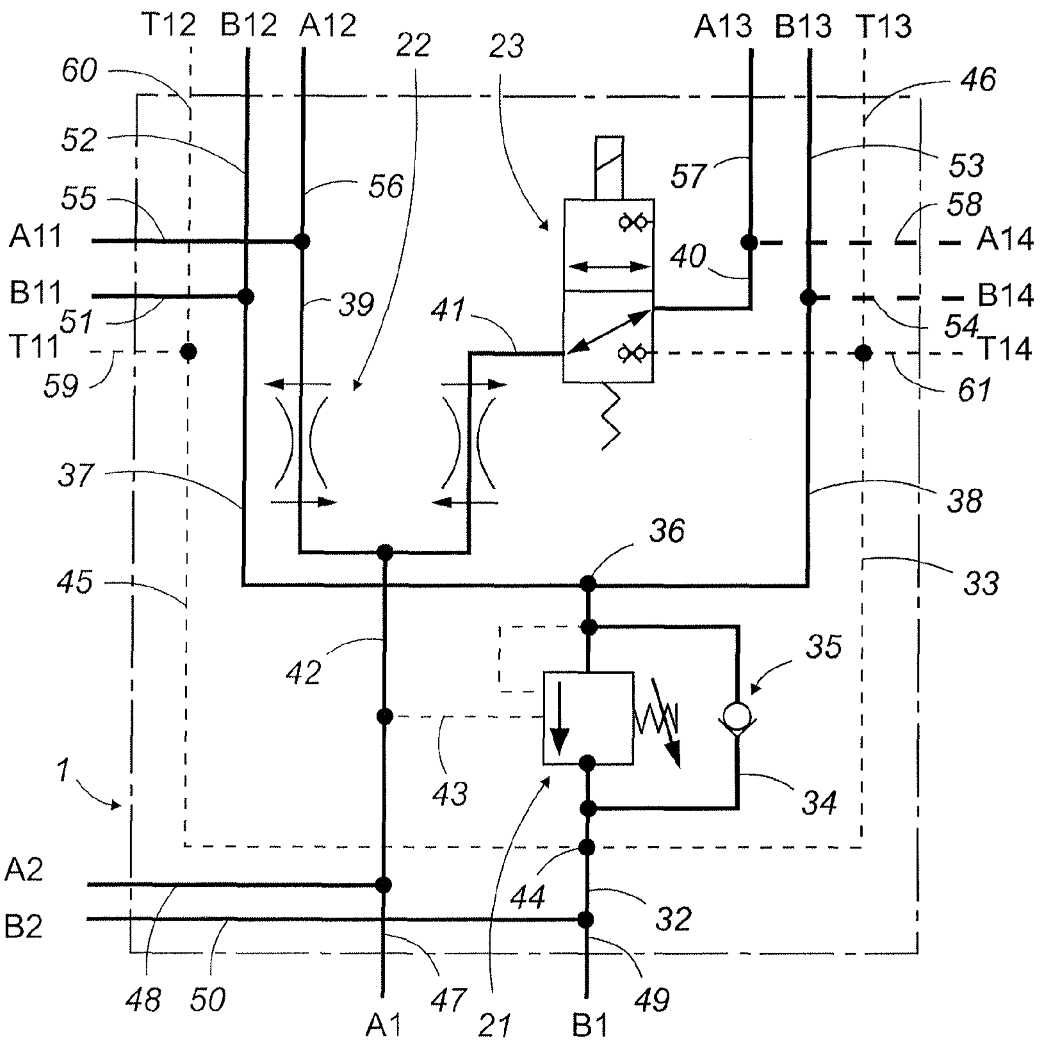
FIG. 9 is a hydraulic schematic of a preferred embodiment of the hydraulic unit, according to the invention, which will be connected to two secured hydraulic cylinders.

In the preferred embodiment shown in FIG. 9, each of the outlets on hydraulic unit 1 is advantageously duplicated by another equivalent outlet located on another surface of the unit.

Inlet conduit 41 is thus divided into two conduits 47 and 48 opening through orifices A1 and A2, respectively. Inlet conduit 32 is also divided into two conduits 49 and 50, respectively, opening through orifices B1 and B2.

Outlet conduits 37, 38, 39 and 40 each split into two conduits, 51 and 52, 53 and 54, 55 and 56, and 57 and 58, respectively, which respectively open through orifices B11 and B12, B13 and B14, A11 and A12, and A13 and A14.

Likewise, supplementary outlet conduits 45 and 33 each split into two conduits 59 and 60, and 46 and 61, respectively, which respectively open through orifices T11 and T12, and T13 and T14.

The operator can thus select the orifices to be used according to need and the accessibility to the lifting area on hydraulic unit 1. The unused orifices are blocked, using simple stoppers, for example.

This preferred embodiment of the hydraulic unit can also be used with simple hydraulic devices 5, 6, each of which require only two tracks for fluid passage, such as for example, conventional hydraulic cylinders 7 and 8 without any securing system. It is only necessary to bypass the supplementary outlet conduits that are not necessary for such an application by simply blocking orifices T11, T12, T13 and T14.

The operation of this preferred hydraulic unit is similar to the basic embodiment and can easily be deduced by studying FIGS. 10 through 13. In these drawings, the duplication of outlets detailed above has not been shown, in the interests of simplification and to facilitate the reader's comprehension.

Figure 10:
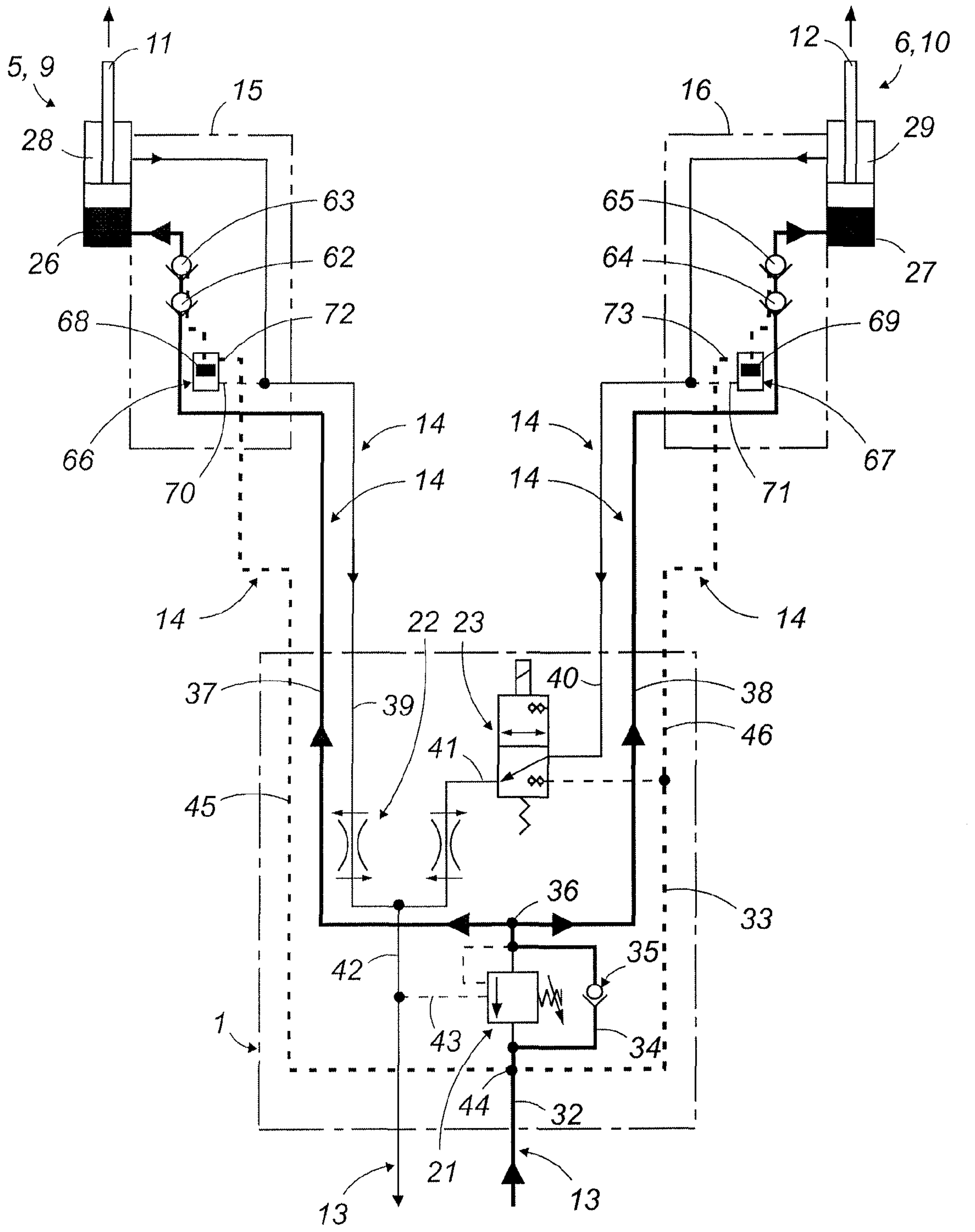
FIGS. 10 and 11 are hydraulic schematics illustrating the operation of the hydraulic unit of FIG. 9 while the shaft of the secured hydraulic cylinders is extended and retracted, respectively.
Figure 11:
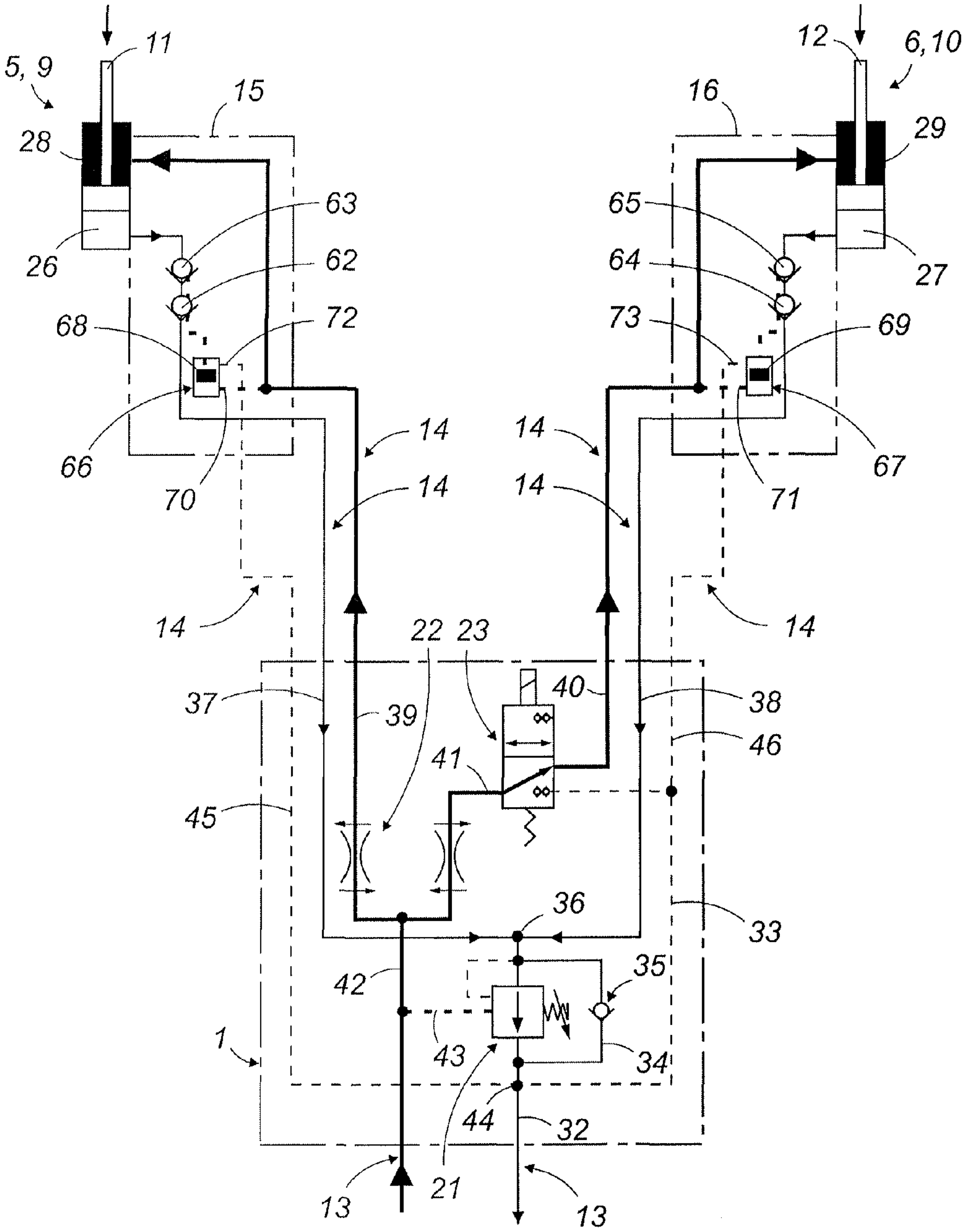

FIGS. 10 and 11 show the normal operation of a lifting system, without the operator ordering resetting, in the direction of the simultaneous extension of shafts 11 and 12 of cylinders 9 and 10 in FIG. 10, and their simultaneous return in FIG. 11.

In the case shown in FIG. 10, the operation is identical to what is described with reference to FIG. 5, apart from the fact that the hydraulic fluid present in outlet conduits 37 and 38 is not sent directly to the large chambers 26 and 27 of cylinders 9 and 10, but passes first through securing devices 15 and 16, respectively.

During its passage, it encounters two successive securing gates, referenced as 62 and 63 respectively, for the left securing device 15, and 64 and 65 for right securing device 16. In this configuration the fluid circulates in the direction allowed by the gates and can therefore pass through, ending at the large chamber of the cylinders and thus causing extension of shafts 11 and 12.

When the supply of hydraulic fluid to hydraulic unit 1 stops, securing devices 15 and 16 ensure that cylinders 9, 10 are maintained in position.

The effect is to hydraulically lock the cylinders using their successive securing gates 62, 63 and 64, 65 which prevent hydraulic fluid from flowing out of the large chambers in the cylinders. The risk of leaks is avoided by the succession of two gates in a series which, in addition, are preferably of different types.

Securing devices 15, 16 for cylinders 9, 10 comprise, additionally, a slide valve regulating means 66, 67, the piston 68 and 69, respectively, of which can mechanically open securing gates 62, 63 and 64, 65 when there is sufficient pressure in control conduit 70, 71.

In order to establish internal equilibrium for the satisfactory operation of these regulatory means 66 and 67, the latter are also connected via conduits 72 and 73 and a distributing connector 14 to supplementary outlet conduits 45 and 46 on hydraulic unit 1.

When the operator commands shafts 11 and 12 of cylinders 9 and 10 to return as shown in FIG. 11, the pressure in control conduits 70 and 71 of the securing devices becomes higher than in conduits 72 and 73. It provokes the extension of piston 68, 69 of regulating means 66 and 67, which then mechanically opens securing gates 62, 63 and 64, 65 on securing devices 15 1*n* 16, thus allowing hydraulic fluid to be evacuated from large cylinder chambers 26, 27.

Figure 12:
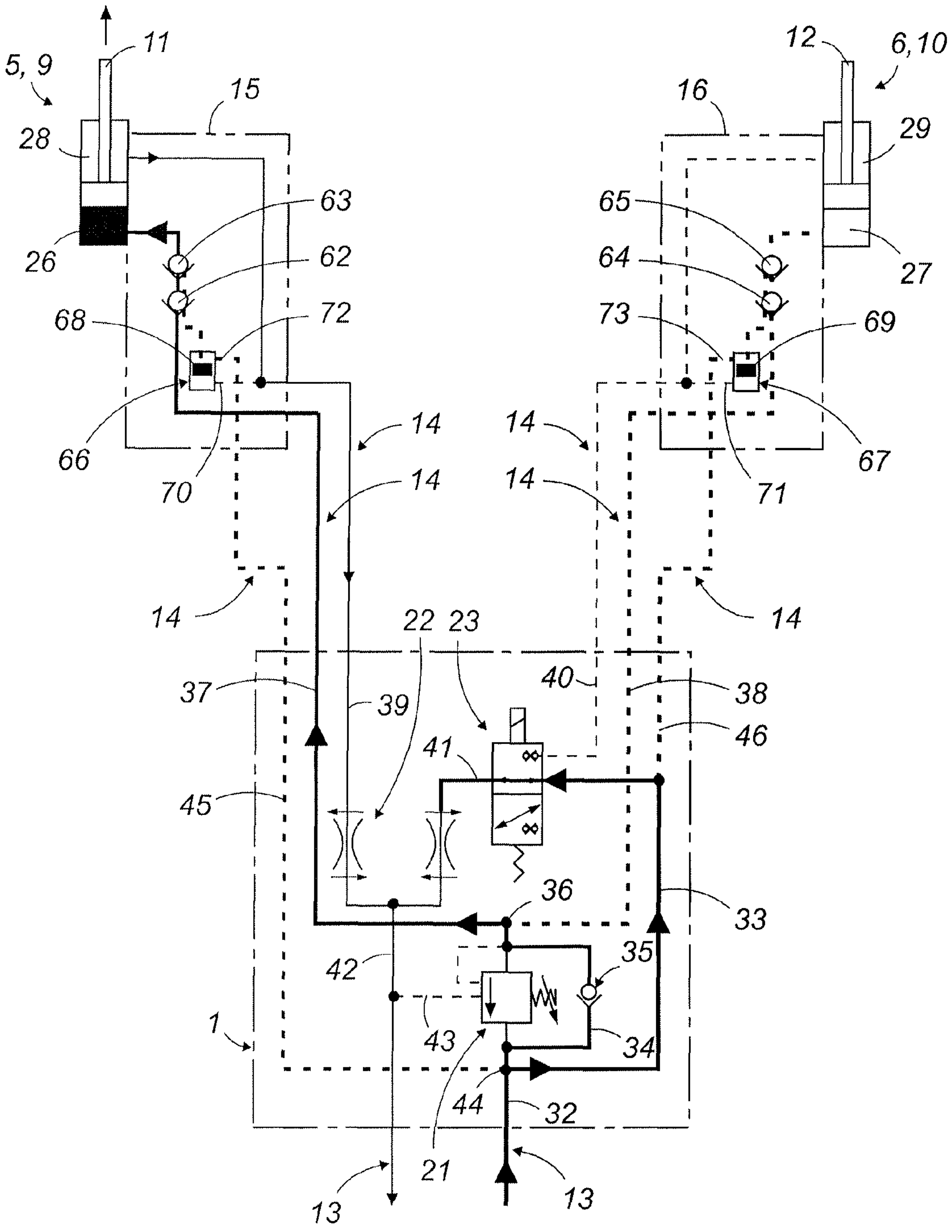
FIGS. 12 and 13 are hydraulic schematics illustrating the operation of the hydraulic unit of FIG. 9 when resetting is requested by the operator, said resetting being accomplished by extension or retraction of the left secured cylinder shaft.
Figure 13:
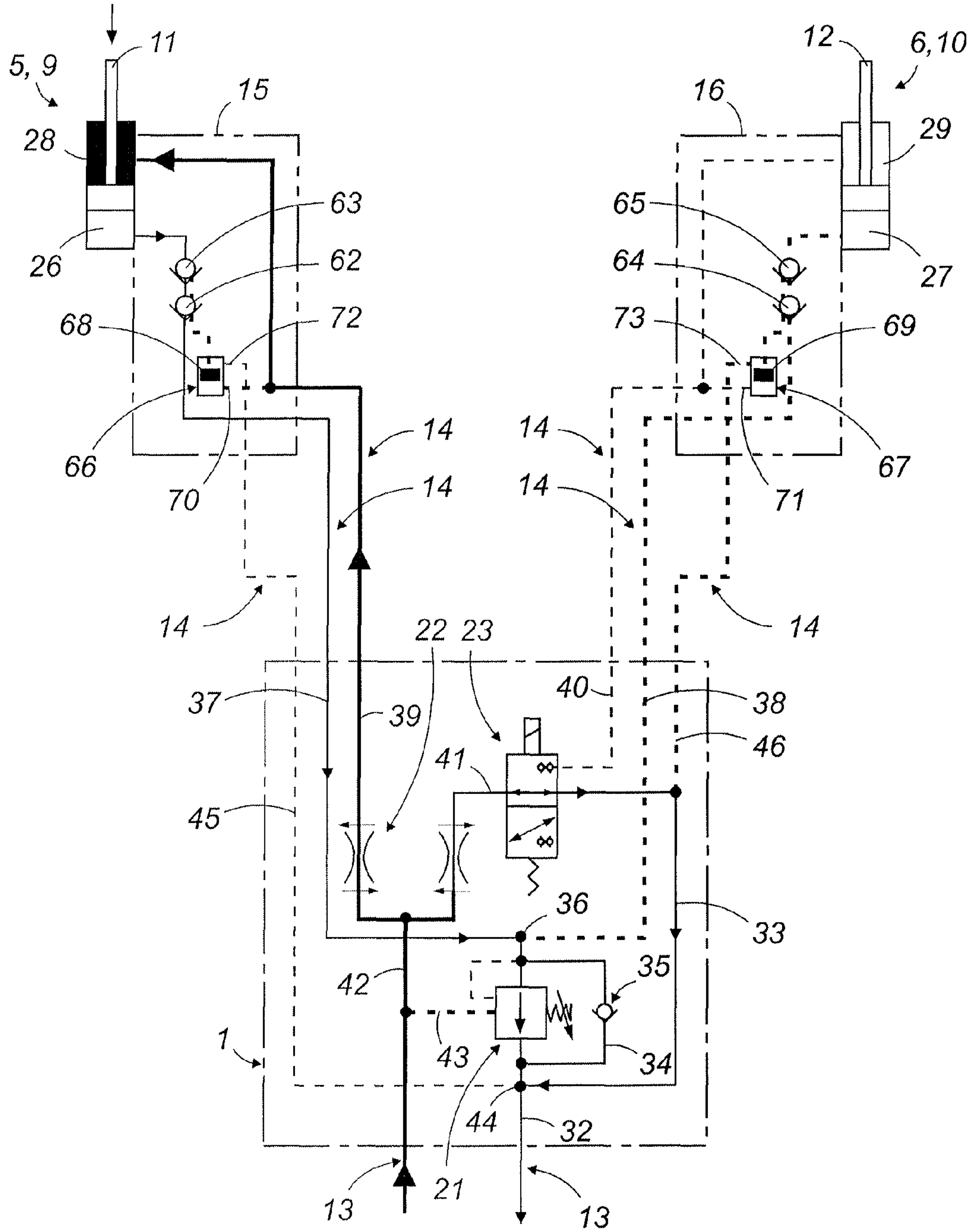

The resetting operation, shown in FIGS. 12 and 13, takes place as before by isolating one cylinder 9 or 10 and stopping its operation while the other cylinder continues to move.

With such secured cylinders 9 and 10, the hydraulic unit preferably comprises no hydraulic component 18 between balance valve 21 and securing device 15, 16 for the secure cylinders. Such hydraulic components could actually interfere with the operation of these securing devices 15, 16. For this reason, stream splitter 22 is preferably placed on the circuit branch that is not connected to securing devices 15, 16. In the example shown, the securing devices are arranged beside large cylinder chamber 26, 27 and the stream splitter 22 is then placed on the circuit branch that is connected to small chambers 28 and 29 of the secure cylinders. This arrangement could easily be reversed in another embodiment of the invention.

It is obvious that the invention is not limited to the preferred embodiments described previously and shown in the different drawings, since a person skilled in the art might make numerous modifications and conceive of other variations without departing from either the scope or the realm of the invention described in the claims.

For example, the simple balance valve shown might be replaced by a double balance valve, or it might be placed on the branch of the circuit that is connected to small cylinder chambers 28, 29 (in the case of cylinders that work by "pulling") and thus on the second inlet conduit 42 of the hydraulic circuit.

It is also possible to use the hydraulic unit of the invention with hydraulic auger motors taking the place of hydraulic cylinders, which would allow these hydraulic motors to be supplied in parallel and not in series, and therefore perhaps to be less powerful. In such an application, balance valve 21 is no longer necessary and it may be eliminated from hydraulic unit 1.

Furthermore, it would be possible for the solenoid valve's passage to the second position be controlled not by the operator, but rather by an automatic device detecting the positions of the two hydraulic lifting devices 5 and 6.

The invention claimed is:

1. A hydraulic unit (1) for installation on a vehicle (2) which comprises at least one plate or platform for carrying cargo, a height of the plate or platform can be modified, the plate or platform being supported by at least one lifting frame formed of mechanically independent right and the left lifting arms, each of the right and left lifting arms being equipped with an independent hydraulic lifting device (5, 6) for varying the height of the plate or platform supported thereby, wherein the hydraulic unit (1) comprises the following hydraulic components (18):

a stream splitter (22) which has a splitter inlet track and two outlet tracks and which regulates flow of fluid to obtain two streams of identical flow rate for two outlet tracks regardless of a fluid flow direction; and a dual position solenoid valve (23) with one valve inlet track and first and second outlet tracks, in a first position of the solenoid valve (23), fluid flow is passable from the valve inlet track to the first outlet track while the second outlet track is blocked, and, in a second position of the solenoid valve (23), fluid flow is passable from the valve inlet track to the second outlet track while the first outlet track is blocked;

the hydraulic components (18) are placed in a hydraulic circuit which comprises:

a first branch comprises a first inlet conduit (32) which is split, at a dividing point (36), into a first outlet conduit (37) and a second outlet conduit (38); and a second branch comprises a second inlet conduit (42) which ends at the splitter inlet track of the stream splitter (22) and extends to the two outlet tracks of the stream splitter (22), on one side, into a third outlet conduit (39) and, on another side, into a conduit (41) which leads to the valve inlet track of the solenoid valve (23) and continues on to the first outlet track of the solenoid valve through a fourth outlet conduit (40) and to the second outlet track of the solenoid valve (23) to a connecting conduit (33) which joins the second outlet track of the solenoid valve (23) to the first inlet conduit (32);

the unit is designed to be connected:

to a hydraulic fluid reservoir, via a hydraulic control unit, for the hydraulic lifting devices (5, 6) at its first inlet conduit (32) and its second inlet conduit (42);

to another of the hydraulic lifting devices (5) at its first outlet conduit (37) and its third outlet conduit (39); and to another of the hydraulic lifting devices (6) at its second outlet conduit (38) and its fourth outlet conduit (40); and the solenoid valve (23) is in its first position, during the normal simultaneous operation of the two hydraulic lifting devices (5, 6) and allows the plate or platform to be raised or lowered, and the solenoid valve (23) passes into its second position to reset the hydraulic lifting devices (5, 6), relative to each other, by immobilizing one of the hydraulic lifting devices (6 or 5) while the other hydraulic lifting device (5 or 6) continues to move, and such resetting is possible at any given time regardless of the direction of operation and the position of the hydraulic lifting devices (5, 6).

2. The hydraulic unit (1) according to claim 1, wherein the hydraulic unit (1) further comprises a stabilizing valve (21) placed on one of the inlet conduits (32, 42) of the hydraulic circuit.

3. The hydraulic unit (1) according to claim 1, wherein the unit including a stabilizing valve (21) which is either a simple stabilizing valve or double stabilizing valve.

4. The hydraulic unit (1) according to claim 1, wherein the hydraulic unit (1) further comprises at least one supplementary outlet conduit (45, 46) joined to the connecting conduit (33) or to the first inlet conduit (32) at a point of intersection (44) located before a stabilizing valve (21).

5. The hydraulic unit (1) according to claim 1, wherein the solenoid valve (23) is a valve with gates.

6. The hydraulic unit (1) according to claim 1, wherein movement of the solenoid valve (23), into its second position, is controlled by an operator or by an automatic device that detects relative positions of the two hydraulic lifting devices (5, 6).

7. The hydraulic unit (1) according to claim 1, wherein the hydraulic unit (1) further comprises a compact body (17) surrounding the hydraulic circuit and the hydraulic components (18).

8. The hydraulic unit (1) according to claim 7, wherein the body (17) is a generally parallelepipedal block in which perforations are drilled to form housings for receiving the hydraulic components (18) as well as the conduits (19) for passage of hydraulic fluid therethrough.

9. The hydraulic unit (1) according to claim 7, wherein at least one of the inlet conduits (32, 42) or outlet conduits (37, 38, 39, 40) or even supplemental outlet conduits (45, 46) on the hydraulic circuit opens outside the body (17) through several equivalent orifices (20).

10. The hydraulic unit (1) according to claim 9, wherein these equivalent orifices (20) are located on different surfaces of the body (17).

11. A vehicle (2) for transporting automobiles, the vehicle (2) comprising:

at least one plate or platform for carrying cargo, a height of the plate or platform can be modified, the plate or platform being supported by at least one lifting frame formed of two mechanically independent right and left lifting arms, each of the right and the left lifting arms being equipped with an independent hydraulic lifting device (5, 6) for varying the height of the plate or platform supported thereby, each of its lifting frames is equipped with a hydraulic unit (1) connected to the hydraulic lifting devices (5, 6) for the frame, wherein each hydraulic unit (1) comprises the following hydraulic components (18):

a stream splitter (22) which has a splitter inlet track and two outlet tracks and which regulates flow of fluid to obtain two streams of identical flow rate for two outlet tracks regardless of a fluid flow direction; and a dual position solenoid valve (23) with one valve inlet track and first and second outlet tracks, in a first position of the solenoid valve (23), fluid flow is passable from the valve inlet track to the first outlet track while the second outlet track is blocked, and in a second position of the solenoid valve (23), fluid flow is passable from the valve inlet track to the second outlet track while the first outlet track is blocked;

the hydraulic components (18) are placed in a hydraulic circuit which comprises:

a first branch comprises a first inlet conduit (32) which is split, at a dividing point (36), into a first outlet conduit (37) and a second outlet conduit (38); and a second branch comprises a second inlet conduit (42) which ends at the splitter inlet track of the stream splitter (22) and extends to the two outlet tracks of the stream splitter (22), on one side, into a third outlet conduit (39) and, on another side, into a conduit (41) which leads to the valve inlet track of the solenoid valve (23) and continues on to the first outlet track of the solenoid valve through a fourth outlet conduit (40) and to the second outlet track of the solenoid valve (23) to a connecting conduit (33) which joins the second outlet track of the solenoid valve (23) to the first inlet conduit (32);

the unit is designed to be connected:

to a hydraulic fluid reservoir, via a hydraulic control unit, for the hydraulic lifting devices (5, 6) at its first inlet conduit (32) and its second inlet conduit (42);

to one of the hydraulic lifting devices (5) at its first outlet conduit (37) and its third outlet conduit (39); and to another of the hydraulic lifting devices (6) at its second outlet conduit (38) and its fourth outlet conduit (40); and the solenoid valve (23) is in its first position, during the normal simultaneous operation of the two hydraulic lifting devices (5, 6) and allows the plate or platform to be raised or lowered, and the solenoid valve (23) passes into its second position to reset the hydraulic lifting devices (5, 6), relative to each other, by immobilizing one of the hydraulic lifting devices (6 or 5) while the other hydraulic lifting device (5 or 6) continues to move, and such resetting is possible at any given time regardless of the direction of operation and the position of the hydraulic lifting devices (5, 6).

12. The vehicle (2) according to claim 11, wherein a hydraulic block (1) is installed on a chassis (3) of the vehicle, between the two lifting arms for the frame, and on a side of the vehicle where the hydraulic control unit for the two hydraulic lifting devices (5, 6) is located.

13. The vehicle (2) according to claim 11, wherein the hydraulic lifting devices (5, 6) are hydraulic cylinders (7, 8), secure hydraulic cylinders (9, 10) or hydraulic auger motors.

14. A vehicle (2) for transporting automobiles, the vehicle (2) comprising:

at least one plate or platform for transporting cargo which is adjustable in height, the plate or platform being supported by at least one lifting frame formed of two mechanically independent left and right lifting arms, each of the left and the right lifting arms being equipped with a secure hydraulic cylinder (9, 10) for varying the height of the plate or platform supported thereby, wherein this at least one lifting frame is equipped with a hydraulic unit (1) that comprises two supplementary outlet conduits (45, 46) each connected to a securing device (15, 16) for one of the secure cylinders (9, 10);

the hydraulic unit (1) further comprises at least one supplementary outlet conduit (45, 46) joined to a connecting conduit (33) or to the first inlet conduit (32) at a point of intersection (44) located before a stabilizing valve (21); and the hydraulic unit (1) comprises the following hydraulic components (18):

a stream splitter (22) which has a splitter inlet track and two outlet tracks and which regulates flow of fluid to obtain two streams of identical flow rate for two outlet tracks regardless of a fluid flow direction; and a dual position solenoid valve (23) with one valve inlet track and first and second outlet tracks, in a first position of the solenoid valve (23), fluid flow is passable from the valve inlet track to the first outlet track while the second outlet track is blocked, and in a second position of the solenoid valve (23), fluid flow is passable from the valve inlet track to the second outlet track while the first outlet track is blocked;

the hydraulic components (18) are placed in a hydraulic circuit which comprises:

a first branch comprises a first inlet conduit (32) which is split, at a dividing point (36), into a first outlet conduit (37) and a second outlet conduit (38); and a second branch comprises a second inlet conduit (42) which ends at the splitter inlet track of the stream splitter (22) and extends to the two outlet tracks of the stream splitter (22), on one side, into a third outlet conduit (39) and, on another side, into a conduit (41) which leads to the valve inlet track of the solenoid valve (23) and continues on to the first outlet track of the solenoid valve through a fourth outlet conduit (40) and to the second outlet track of the solenoid valve (23) to a connecting conduit (33) which joins the second outlet track of the solenoid valve (23) to the first inlet conduit (32);

the unit is designed to be connected:

to a hydraulic fluid reservoir, via a hydraulic control unit, for the hydraulic lifting devices (5, 6) at its first inlet conduit (32) and its second inlet conduit (42);

to one of the hydraulic lifting devices (5) at its first outlet conduit (37) and its third outlet conduit (39); and to another of the other hydraulic lifting devices (6) at its second outlet conduit (38) and its fourth outlet conduit (40); and the solenoid valve (23) is in its first position, during the normal simultaneous operation of the two hydraulic lifting devices (5, 6) and allows the plate or platform to be raised or lowered, and the solenoid valve (23) passes into its second position to reset the hydraulic lifting devices (5, 6), relative to each other, by immobilizing one of the hydraulic lifting devices (6 or 5) while the other hydraulic lifting device (5 or 6) continues to move, and such resetting is possible at any given time regardless of the direction of operation and the position of the hydraulic lifting devices (5, 6).

* * * * *